(12) United States Patent
Boncalo et al.

(10) Patent No.: US 9,046,210 B2
(45) Date of Patent: Jun. 2, 2015

(54) EASY-FORMING METALLIC INSULATION ELBOW JACKETS

(75) Inventors: Lucian G. Boncalo, The Woodlands, TX (US); Jyi-Jiin Luo, Morton Grove, IL (US); James Robinson, Mundelein, IL (US); Sailesh B. Athreya, Lake Villa, IL (US)

(73) Assignee: Illinois Tool Workers Inc., Glenview, IL (US)

( * ) Notice: Subject to any disclaimer, the term of this patent is extended or adjusted under 35 U.S.C. 154(b) by 1250 days.

(21) Appl. No.: 12/641,924

(22) Filed: Dec. 18, 2009

(65) Prior Publication Data

US 2010/0156091 A1 Jun. 24, 2010

Related U.S. Application Data

(60) Provisional application No. 61/138,607, filed on Dec. 18, 2008.

(51) Int. Cl.
*F16L 43/00* (2006.01)
*F16L 59/22* (2006.01)

(52) U.S. Cl.
CPC .................................... *F16L 59/22* (2013.01)

(58) Field of Classification Search
USPC .................. 285/45, 179, 179.2, 183
See application file for complete search history.

(56) References Cited

U.S. PATENT DOCUMENTS 3,153,546 A * 10/1964 Dunn ............................... 285/13
4,830,060 A * 5/1989 Botsolas ....................... 138/149

* cited by examiner

*Primary Examiner* — Daniel P Stodola
*Assistant Examiner* — Gwendolyn Driggers
(74) *Attorney, Agent, or Firm* — Levenfeld Pearlstein, LLC

(57) ABSTRACT

An improved protective jacket for insulated, angled pipe includes a metal jacket having a first portion and a second portion, each portion having a generally semi-circular cross-section, and including two or more fingers. Each of the fingers defines a fillet at a junction of the fingers and a baseline of the jacket. The fingers include a flat face at an inner angle and curve from the flat face to a superior surface of the jacket. A first finger is formed a minimum distance of about 0.5 inches from a second finger, and a width of the fingers is created by an isosceles triangle with a radius of curvature between about 0.3 inches and 0.5 inches.

13 Claims, 4 Drawing Sheets

EASY-FORMING METALLIC INSULATION ELBOW JACKETS

CROSS-REFERENCE TO RELATED APPLICATION

This application claims the benefit of priority of Provisional U.S. Patent Application Ser. No. 61/138,607, filed Dec. 18, 2008, entitled "EASY-FORMING METAL INSULATION ELBOW JACKETS".

BACKGROUND OF THE INVENTION

The present invention is directed to an insulation jacket. More particularly, the present invention pertains to an improved, protective, metal insulation jacket having an improved elbow bend configuration.

Pipes and/or machinery are often insulated with fiberglass, polyurethane or other similar materials. The insulation which covers the pipe often requires metal covers or jackets to be placed over the insulation to preserve and protect the insulation material itself.

Covering linear pipe with metal is relatively simple: a flat metal sheet is wrapped concentrically around the linear cylindrical portion of pipe and secured with strap or fasteners. Linear portions of pipe may be covered with, for example, 1000 or 3000 series aluminum.

Protecting the turns and bends in the pipe, such as at angled portions, tees, or elbows, can be difficult, however. Corner or elbow portions of pipes are typically covered using the softer or more malleable 1000 series aluminum to facilitate wrapping around the bend portion. Preformed metal jackets are also used to protect angled pipe. A flat metal sheet is press or punch molded in two, generally semi-circular, angled portions. Each portion is wrapped around opposing sides of the pipe and the seams are joined by, for example, welding, screws, and/or straps.

The mold for such elbow jackets is generally made from composite, steel, or similar materials, and have three or more random, finger-like indentations present to compensate for excess metal bunching or accumulating at the inner curvature of the angle or elbow during the pressing or punching process.

The malleability of 1000 series aluminum used for the preformed jackets, however, also makes the jacket more susceptible to dents. Additionally, the material tends to accumulate or bunch at the inner elbow, as shown in FIG. 1, creating creases or folds F and gaps G. Folds and gaps can be unsightly and can act as an accumulation location for dirt and debris to be trapped in the jacket, aiding corrosion and deterioration of both the protective metal covering and the underlying insulation.

As discussed above, while angled portions are protected with 1000 (temper 0, fully annealed) series aluminum jackets, linear portions of insulated pipe are protected by jackets made from a more durable 3000 series, H12 or H14 aluminum, or stainless steel (SS304 and SS316 or similar). Thus, at times there are portions of pipe that have transition areas such as at elbows made from 1000 series aluminum, while the remaining portions are, for example, 3000 series aluminum, in one stretch of pipe. Having multiple types of metal in a length of pipe produces non-uniformity in jacket coverings, as well as different maintenance schedules and fastening systems.

Additionally, while the mold for the angle or elbow portions is suitable for use with softer metals such as 1000 series aluminum, the same mold cannot be used with harder metals, such as 3000 or 5000 series aluminum or SS304 and SS316 stainless steel. Harder metals have a tendency to crack under the stresses produced by the configuration of these molds on the such harder materials.

Furthermore, in addition to the mold having undesired affects on the harder metal, the material itself is not as malleable as the 1000 series counterpart and is difficult to bend and mold. Thus, both the elbow mold and the type of material used have been relegated to 1000 series aluminum and molds with 3 or more fingers to accommodate extra material.

Accordingly, it would be desirable to have an elbow jacket made from more durable metal, such as 3000 series aluminum or harder or stainless steel. Also desirable is a mold for making such a protective jacket for other than straight sections of pipe.

BRIEF SUMMARY OF THE INVENTION

An improved protective jacket for insulated, angled pipe includes a metal jacket having a first portion and a second portion, wherein each of the first portion and the second portion have a generally semi-circular cross-section and include two or more fingers. Each of the fingers on the first portion and each of the fingers of the second portion define a fillet at a junction of the fingers and a baseline of the jacket. The jacket may also include a fillet at a peak of each of the fingers.

The jacket is formed from an aluminum alloy, stainless steel, aluzinc, galvanized or similar materials. The jacket may include a polysurlyn coating on an interior surface of the jacket and a protective coating on an exterior surface of the jacket.

The fingers of the first portion and the second portion include a flat face at an inner angle. The finger curves from the flat face to a superior surface of the jacket. In an embodiment, a first finger is formed a minimum distance of about 0.5 inches from a second finger on the same portion.

The shape or width of the fingers can be described in terms of a rounded isosceles triangle having base angles of about 45 degrees. The rounded portion includes a radius of curvature between about 0.3 inches and 0.5 inches. The height of a finger created by such a triangle is about 0.297 inches to about 0.5 inches in an example. The jacket, in an embodiment, includes only two fingers on the first portion and only two fingers on the second portion, while in another embodiment only three fingers on the first portion and only three fingers on the second portion are present.

The first portion and the second portion overlap at a generally gapless seam. The first portion and the second portion are joined together with a plurality of fasteners and/or with strap that can be made from metal, plastic, fiber, and the like.

A mold for manufacturing the improved insulation jacket for angled pipe includes a female mold and a male mold. The male mold is convex and has a generally semi-circular cross-section and two or more fingers. Each of the fingers includes a fillet at a junction of the fingers and a baseline of the mold. The female mold is concave, corresponds to the male mold, and is configured to form the improved insulation jacket.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
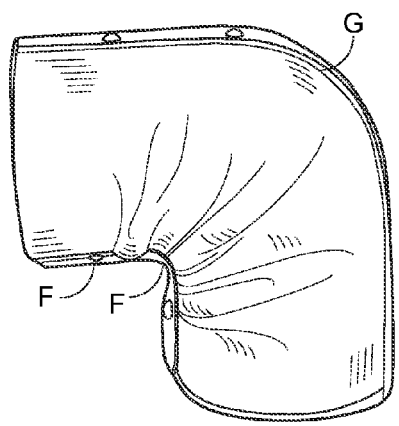
FIG. 1 is a perspective view of a prior art metal insulation jacket.
Figure 2:
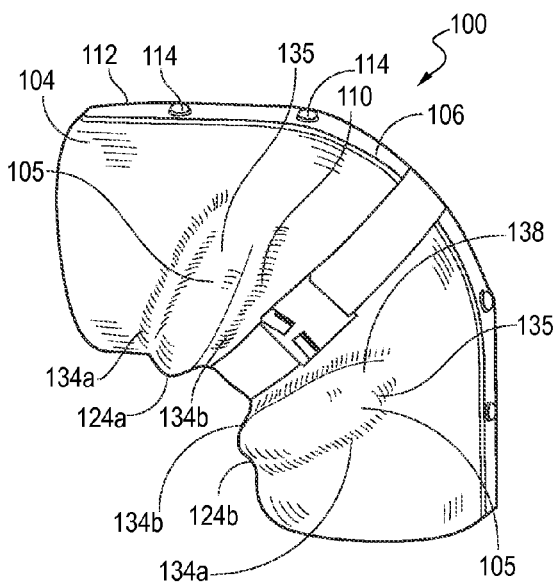
FIG. 2 is a perspective view of an improved metal insulation jacket in accordance with the principles of the present invention.
Figure 3:
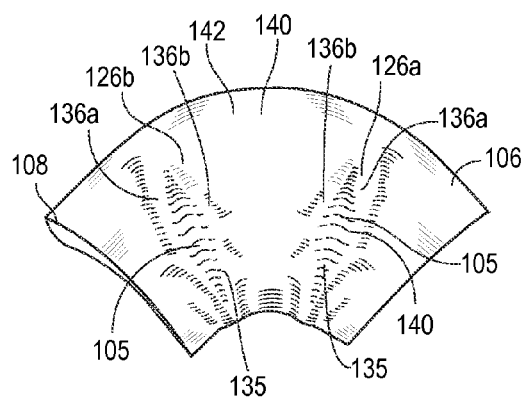
FIG. 3 is a perspective view of an exterior surface of a first portion of the improved metal insulation jacket.
Figure 3A:
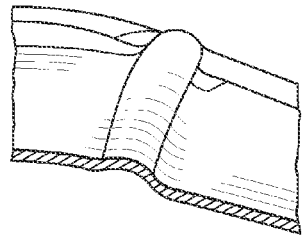
FIG. 3A is a cross-sectional view of FIG. 3 along line 3A-3A.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Figure 4:
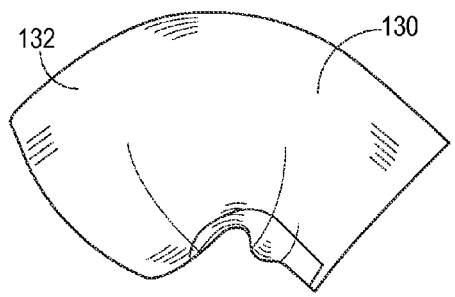
FIG. 4 is a perspective view of an interior surface of the first portion of the improved metal insulation jacket.
Figure 5:
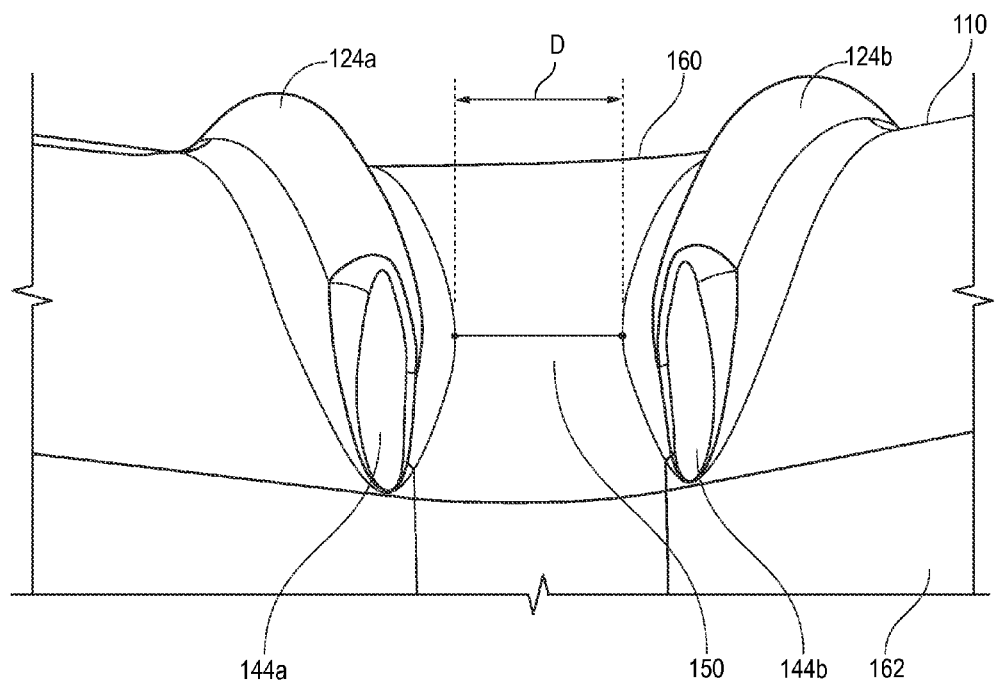
FIG. 5 is a perspective view of an inner curvature of the improved metal insulation jacket.
Figure 6:
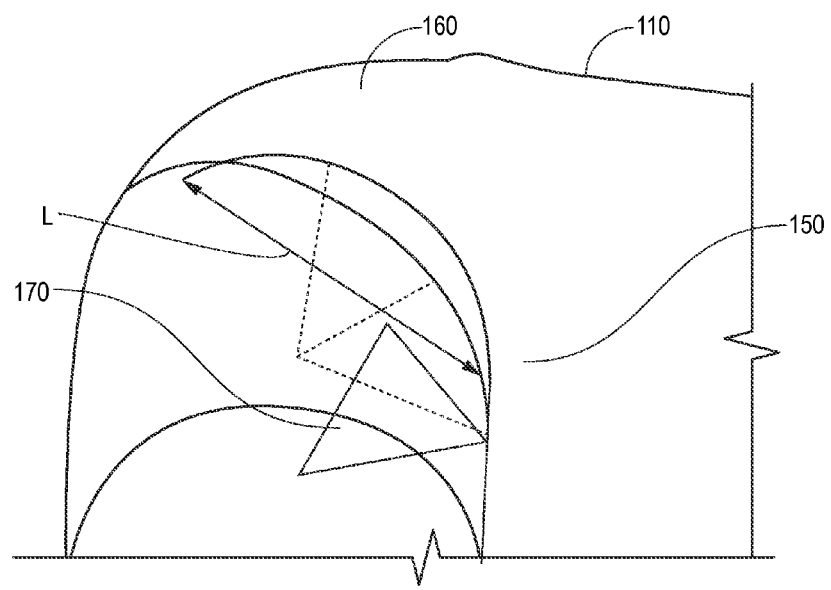
FIG. 6 is another perspective view of the improved metal insulation jacket.
Figure 7:
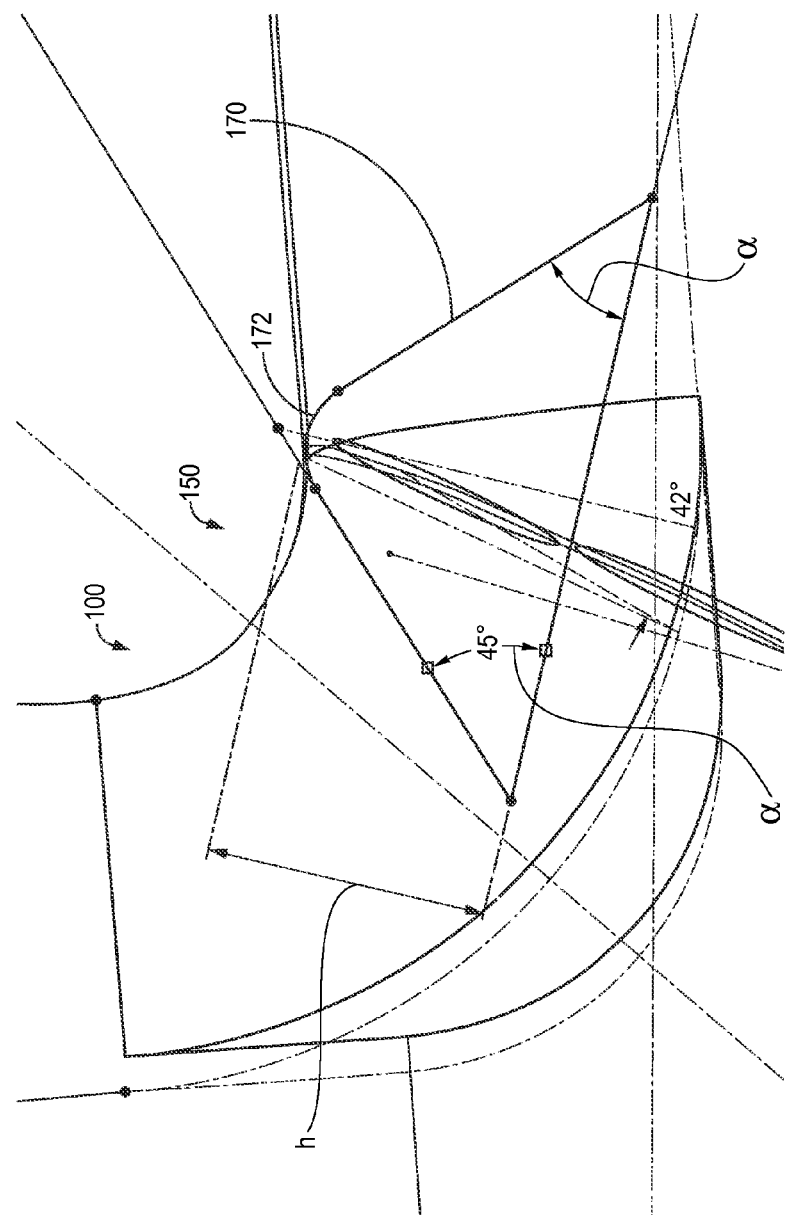
FIG. 7 is a top view of the improved metal insulation jacket.
Figure 8:
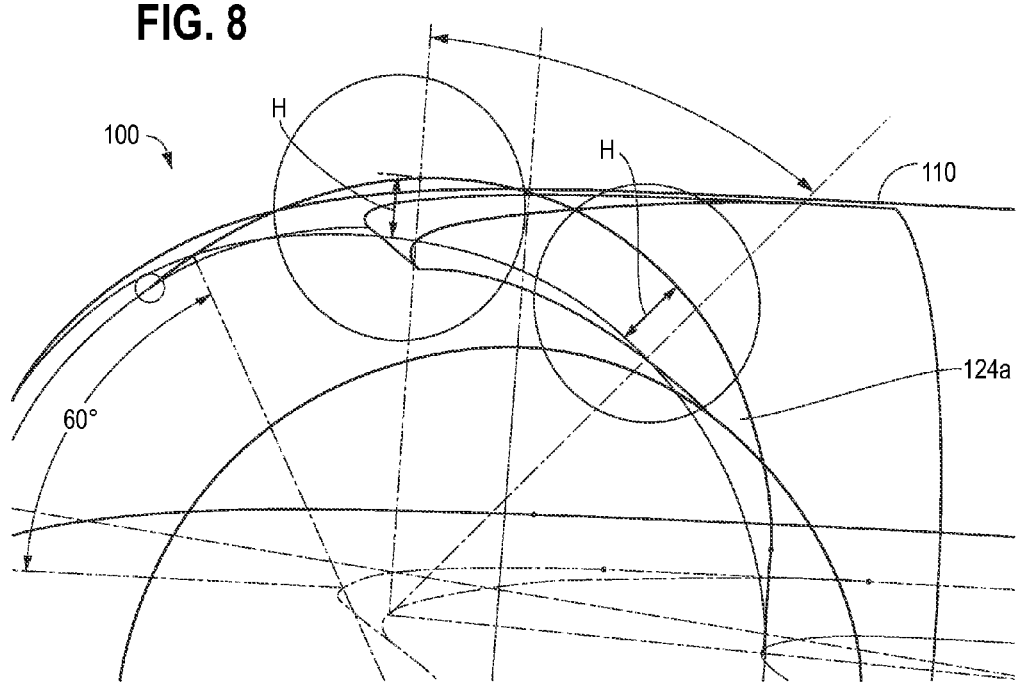
FIG. 8 is a perspective view of an example of the improved metal insulation jacket.

Referring now to the figures and in particular FIGS. 2-5, an improved protective jacket 100 for insulated, angled pipe, also referred to herein as pipe elbow, and includes a metal jacket 102 having a first portion 104 (FIG. 3) and a second portion 106 (FIG. 4). Both the first portion 104 and the second portion 106 have a generally semi-circular cross-section 108 and include two or more fingers 124a, 124b, 126a, 126b.

The fingers 124a, 124b on the first portion 104, and the fingers 126a, 126b on the second portion 106, define a fillet 134a, 134b, 136a, 136b at a junction 138 of the fingers 124a, 124b, 126a, 126b and a baseline 110 of the jacket 102. The baseline 110 of the jacket 102 refers to the exterior surface 140 of the jacket 102 without formation of the fingers 124a, 124b, 126a, 126b. The jacket 102 can also include a fillet 135 at a peak 105 of each of the fingers 124a, 124b, 126a, 126b (see, e.g. FIGS. 2 and 3).

The jacket 102 is formed from an aluminum alloy, such as 3000 series aluminum, H12, and H14, a stainless steel SS304/SS316 material, and the like. The jacket 102 may include a polysurlyn coating 132 on an interior surface 130 of the jacket 102 and a protective coating 142 on the exterior surface 140 of the jacket 102.

The first portion 104 and the second portion 106 of the jacket 102 overlap at a generally gapless seam 112. The portions 104, 106 are fastened together with a plurality of fasteners 114, and/or a strap 116 that can be made from metal, fiber, plastic, and the like. It is important to assume that the strap material is compatible with the jacket material.

Turning now to FIGS. 5-8, the features of the improved jacket 102 will be discussed as the features relate to the first portion 104 of the jacket 102. It will be appreciated, however, that similar or corresponding features are present on the second portion 106 of the jacket 102 as well.

The fingers 124a, 124b of first portion 104 include a flat face 144a, 144b at an inner angle or curve 150 of the jacket 102. The fingers 124a, 124b curve from the flat faces 144a, 144b at the inner angle 150, up to a superior surface 160 of the jacket 102.

The shape of the fingers is formed as a graduated, rounded triangle, having gently sloping (filleted) sides and peaks. The finger shape can be described in terms of a sweep of the isosceles triangle 170 from a flat position to an upright position, wherein the triangle 170 has base angles α of about 45 degrees and a rounded peak 172 having a radius of curvature R between about 0.3 inches and 0.5 inches (see also FIG. 3b) and a height h. In one example, the height h may be 1.250 inches, and the radius of curvature R may be 0.313 inches. Such a triangle sweep results in a finger 124a, 124b having a height H ranging between about 0.297 inches and 0.5 inches along a length L of the finger 104. The height H may vary along a length of the finger. For example, at one point, the height H may be 0.297 inches and at another point the height H may be 0.359 inches.

In an example of a first portion 104, a first finger 124a on a first portion 104 is formed a minimum distance D of about 0.5 inches from a second finger 124b on the first portion 104. The jacket 102 in one embodiment includes two fingers on the first portion 104 and two fingers on the second portion 106. It will be appreciated by those with skill in the art that, in another embodiment, three fingers on the first portion and three fingers on the second portion may be present.

Figure 9:
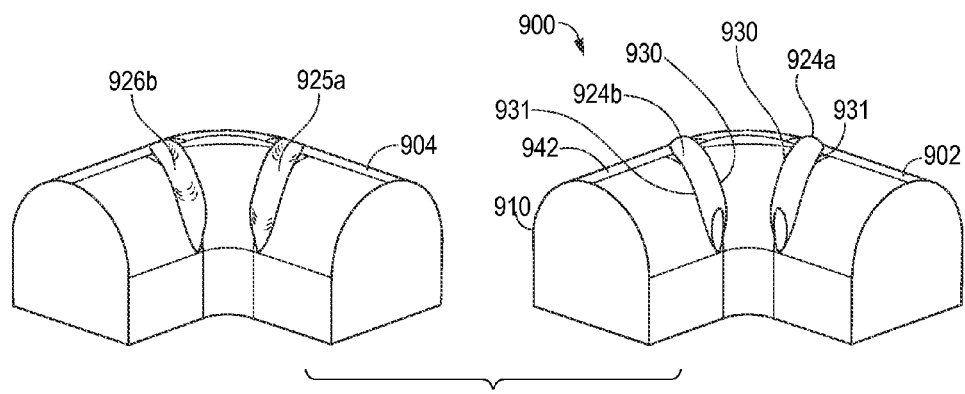
FIG. 9 is a perspective view of a mold to make the improved protective jacket.

In FIG. 9, a mold for 900 manufacturing the improved insulation jacket for angled pipe includes a female mold 904 and a male 902 mold. The male mold 902 has a generally semi-circular cross-section 910 and two or more fingers 924a, 924b. Each of the fingers 924a, 924b includes a fillet-forming area 930, 931 at a junction 940 of the fingers and a baseline 942 of the mold 900. The female mold 904 corresponds to the male mold 902 and is configured to form the improved insulation jacket.

The advantages of the improved metal jacket will be appreciated by those with skill in the art. The improved fingers on the jacket allow for harder, less malleable metals to be used in angled jackets, such as elbow jackets, than have previously been used. The improved fingers are formed more easily such that the new form not only minimizes mechanical stretching of the metal, but also reduces warping of the jacket at the junction of the two portions. Furthermore, the improved jacket reduces the creases and thus, debris which can accumulate in the creases, reducing potential areas of corrosion and providing a smooth, desirable surface.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A protective jacket for insulated, angled pipe comprising:
a metal jacket having a first portion and a second portion, wherein each of the first portion and the second portion has a generally semi-circular cross-section, and wherein each of the first portion and the second portion include two or more fingers, each finger asymmetrically positioned in a circumferential direction relative to each of the first and second portions, the fingers on the first portion and the fingers on the second portion defining a fillet at a junction of the fingers and a baseline of the jacket, each finger extending along a length between a first end and a second end in the circumferential direction, wherein each finger includes a first segment of continuously increasing height relative to the baseline along the length in a direction from the first end to the second end and a second segment of continuously decreasing height relative to the baseline along the length in a direction from the first end to the second end, and each of the first segment and second segment positioned in series and continuous with one another, wherein each finger includes a flat face at an inner angle of the jacket and wherein each finger curves from the flat face to a superior surface on the jacket such that each finger is shaped as a rounded isosceles triangle swept from a flat position to an upright position.

2. The jacket of claim 1 including a fillet at a peak of one or more of the fingers.

3. The jacket of claim 1 wherein the jacket is formed from an aluminum alloy, stainless steel, aluzinc or galvanized material.

4. The jacket of claim 1 including a polymeric coating on an interior surface of the jacket.

5. The jacket of claim 4, wherein the polymeric coating is polysurlyn.

6. The jacket of claim 1 including a protective coating on an exterior surface of the jacket.

7. The jacket of claim 1 wherein a first finger is formed at least about 0.5 inches from a second finger to accommodate banding.

8. The jacket of claim 1 wherein a radius of curvature of one of the fingers is between about 0.3 inches and 0.5 inches.

9. The jacket of claim 1 including two fingers on the first portion and two fingers on the second portion.

10. The jacket of claim 1 including three fingers on the first portion and three fingers on the second portion.

11. The jacket of claim 1 wherein the first portion and the second portion overlap at a seam.

12. The jacket of claim 1 wherein the first portion and the second portion are joined together with a plurality of fasteners.

13. The jacket of claim 1 wherein the first portion and the second portion are joined together with strap made from metal, fiber, or plastic.

* * * * *

UNITED STATES PATENT AND TRADEMARK OFFICE
CERTIFICATE OF CORRECTION

PATENT NO. : 9,046,210 B2  
APPLICATION NO. : 12/641924  
DATED : June 2, 2015  
INVENTOR(S) : Boncalo et al.

Page 1 of 1

It is certified that error appears in the above-identified patent and that said Letters Patent is hereby corrected as shown below:

On the Title Page

Item (73) assignee, column 1, line 1, "Workers" to read as --Works--.

Signed and Sealed this
Twenty-fourth Day of November, 2015

Michelle K. Lee
*Director of the United States Patent and Trademark Office*